(12) United States Patent
Abe et al.

(10) Patent No.: US 11,194,313 B2
(45) Date of Patent: Dec. 7, 2021

(54) NUMERICAL CONTROLLER

(71) Applicant: Fanuc Corporation, Yamanashi (JP)

(72) Inventors: Chihiro Abe, Yamanashi (JP); Manabu Saitou, Yamanashi (JP); Takenori Ono, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/712,270

(22) Filed: Dec. 12, 2019

(65) Prior Publication Data

US 2020/0192334 A1 Jun. 18, 2020

(30) Foreign Application Priority Data

Dec. 17, 2018 (JP) .............................. JP2018-235835

(51) Int. Cl.
  *G05B 19/4155* (2006.01)
  *G05B 19/414* (2006.01)

(52) U.S. Cl.
  CPC ..... *G05B 19/4155* (2013.01); *G05B 19/4141* (2013.01); *G05B 2219/35259* (2013.01)

(58) Field of Classification Search
  CPC ............ G05B 19/4155; G05B 19/4141; G05B 2219/35259; G05B 19/19; G05B 2219/35349
  USPC ......................................................... 700/23
  See application file for complete search history.

(56) References Cited

U.S. PATENT DOCUMENTS

| | | | | |
|---|---|---|---|---|
| 5,914,876 A | * | 6/1999 | Hirai ................ | G05B 19/41835 700/87 |
| 7,043,332 B1 | * | 5/2006 | Fujinawa ................ | B23B 3/168 700/159 |
| 2008/0281462 A1 | * | 11/2008 | Suh .................. | G05B 19/40931 700/181 |
| 2008/0288103 A1 | * | 11/2008 | Otsuki ................. | G05B 19/404 700/189 |
| 2019/0271965 A1 | * | 9/2019 | Tsuda ................. | G05B 19/4086 |

FOREIGN PATENT DOCUMENTS

JP 57-201903 A 12/1982

* cited by examiner

*Primary Examiner* — Kenneth M Lo
*Assistant Examiner* — Mohammed Shafayet
(74) *Attorney, Agent, or Firm* — RatnerPrestia (57) ABSTRACT

A numerical controller includes a command analysis unit for analyzing the machining program in which the axis movement command for a plurality of sections is described in one block of the machining program in a reading processing for the one block to specify a plurality of coordinate values or movement amounts, and a block information generation unit for generating the block information for the plurality of sections based on the plurality of coordinate values or movement amounts. Each of one or more addresses is described only once and a plurality of command values corresponding to the respective addresses is described according to a predetermined order in the axis movement command, and the command analysis unit specifies a correlation between the addresses and the command values according to the order.

8 Claims, 8 Drawing Sheets

PROGRAM EXAMPLE

FIG. 2

PREFETCH PROCESSING

CONVENTIONAL

FORMAT EXAMPLE OF AXIS MOVEMENT COMMAND

FIG. 6

EXAMPLE

· EXAMPLE OF GIVING COMMAND BY INCLUDING G CODE IN GROUPING

· EXAMPLE OF COMMAND USING ARRAY TYPE VARIABLE

```
O1001 ;
DEF #ABC[3,10] = [[1,2,3],[2,3,4],[3,4,5], ···,[10,11,12]];
N21 G91G00 X,Y,Z=[100.,100.,100.] F400. ;
N22 G01 X,Y,Z=#ABC ;
   :
```

FIG. 9

- EXAMPLE OF GIVING COMMAND BY READING EXTERNAL FILE
  (CSV FORMAT, CAM DATA, ETC.)

```
O1001 ;
N21 G91G00 X,Y,Z=[100.,100.,100.] F400. ;
N22 G01 X,Y,Z=LOAD["PATH1.CSV"] ;
...
```

PATH1.CSV

- EXAMPLE OF GIVING COMMAND BY READING EXTERNAL FILE
  (CSV FORMAT, CAM DATA, ETC.)

```
O1001 ;
N21 G91G00 X,Y,Z=[100.,100.,100.] F400. ;
N22 G01 X,Y,Z=LOAD["CAM_DATA.NC"] ;
...
```

CAM_DATA.NC

NUMERICAL CONTROLLER

RELATED APPLICATIONS

The present application claims priority to Japanese Patent Application Number 2018-235835 filed Dec. 17, 2018, the disclosure of which is hereby incorporated by reference herein in its entirety.

BACKGROUND OF THE INVENTION

1. Field of the Invention

The present disclosure relates to a numerical controller, and particularly relates to a numerical controller that realizes simple and efficient performance of continuous axis control commands for a plurality of axes.

2. Description of the Related Art

Figure 1:
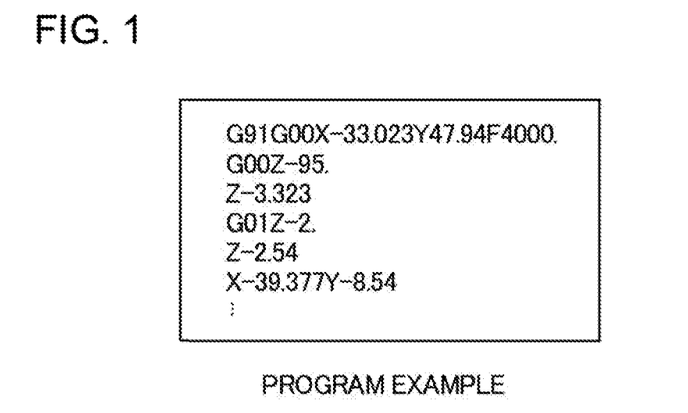
FIG. 1 is a diagram illustrating an example of a conventional machining program.

In a machining program (NC program) executed by a numerical controller, one line segment or arc movement command is normally described for each block. Therefore, when a machining path including a plurality of line segments or arcs is commanded, it is necessary to describe the axis movement command continuously over a plurality of blocks (see FIG. 1).

In addition, the numerical controller normally reads command blocks described in the NC program successively from a head to analyze a program, generates block information, performs interpolation processing based on the block information, and creates a distribution pulse of each axis.

Figure 2:
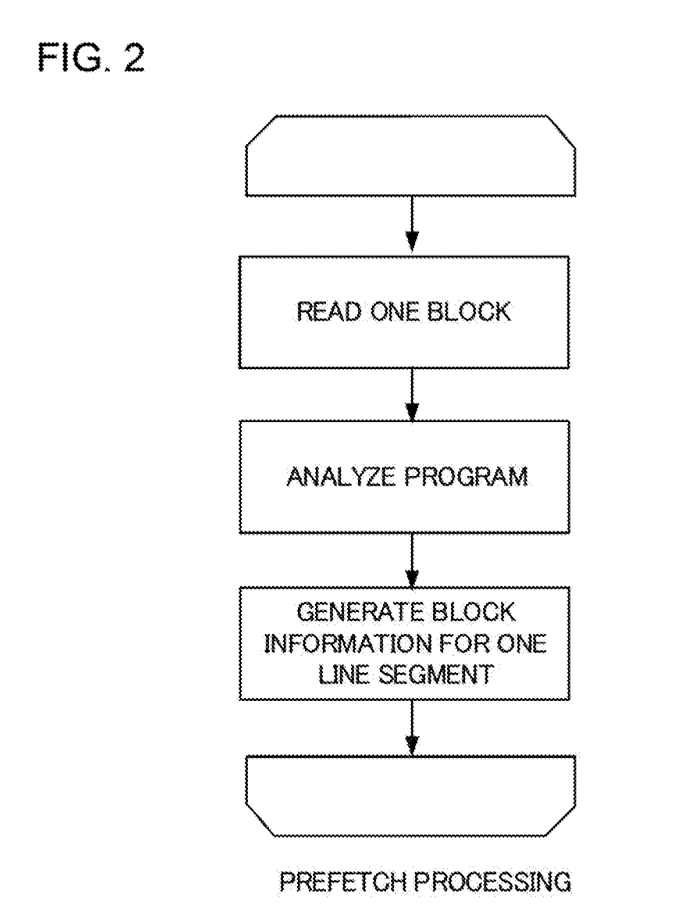
FIG. 2 is a diagram illustrating an example of conventional prefetch processing.

To obtain an excellent machined surface, the numerical controller needs to continuously create and output the distribution pulse without interruption. For this reason, the numerical controller needs to complete creation of block information necessary for interpolation prior to interpolation processing. Therefore, the numerical controller normally starts reading each block of the NC program before a command described in the block is executed, and analyzes all commands included in the NC program, which is referred to as prefetch processing (see FIG. 2).

The conventional axis movement command has the following problems.

(1) Only one section can be commanded in one block. For this reason, block information that can be created in prefetch processing for one block basically corresponds to one line segment. When a canned cycle function is used, a plurality of pieces of block information can be generated by one block command. However, the canned cycle function is used only in a limited aspect such as repeating a predetermined operation, and is not a general function.

(2) In prefetch processing, each time one block is analyzed, in addition to command analysis, processing such as modal switching or determination of various signals is performed together. For this reason, when the number of blocks increases, the number of processing times other than command analysis increases, and an overall processing time increases.

As a scheme for solving such a problem, it is conceivable to provide a scheme for generating line segments of a plurality of sections using one block command. For example, JP 57-201903 A describes a numerical controller that performs an operation over a plurality of sequences in one block.

However, the scheme described in JP 57-201903 A has restrictions that a subprogram function for performing the operation over the plurality of sequences is necessary, and it is necessary to use a specific character to describe a plurality of operations. For these reasons, there are problems in that the use of this scheme requires complicated work and a situation to which the scheme is applied is limited.

The disclosure is for solving such a problem, and an object of the disclosure is to provide a numerical controller that realizes simple and efficient performance of continuous axis control commands for a plurality of axes.

SUMMARY OF THE INVENTION

A numerical controller according to an embodiment of the disclosure is a numerical controller for analyzing an axis movement command described in a machining program to generate block information of a path, the numerical controller including a command analysis unit for analyzing the machining program in which the axis movement command for a plurality of sections is described in one block of the machining program in a reading processing for the one block to specify a plurality of coordinate values or movement amounts, and a block information generation unit for generating the block information for the plurality of sections based on the plurality of coordinate values or movement amounts, in which each of one or more addresses is described only once and a plurality of command values corresponding to the respective addresses is described according to a predetermined order in the axis movement command, and the command analysis unit specifies a correlation between the addresses and the command values according to the order.

In the numerical controller according to an embodiment of the disclosure, a modal switching processing is performed after the block information for the plurality of sections described in the one block is generated.

In the numerical controller according to an embodiment of the disclosure, the plurality of command values is given as array type variables.

In the numerical controller according to an embodiment of the disclosure, the plurality of command values is given by an external file.

In the numerical controller according to an embodiment of the disclosure, the one or more addresses and the plurality of command values are given as a data set.

In the numerical controller according to an embodiment of the disclosure, the one or more addresses are related to various commands other than a command of a coordinate value or a movement amount.

In the numerical controller according to an embodiment of the disclosure, the addresses are allowed to be omitted when there is no change in the command values corresponding to the addresses.

In the numerical controller according to an embodiment of the disclosure, the command values corresponding to the addresses are allowed to be omitted when there is no change in the command values.

According to the present disclosure, it is possible to provide a numerical controller that realizes simple and efficient performance of continuous axis control commands for a plurality of axes.

BRIEF DESCRIPTION OF THE DRAWINGS

The above-described object and feature of the disclosure and other objects and characteristics will be apparent from description of embodiments below with reference to accompanying drawings. In the drawings.

DETAILED DESCRIPTION OF THE PREFERRED EMBODIMENTS

Figure 3:
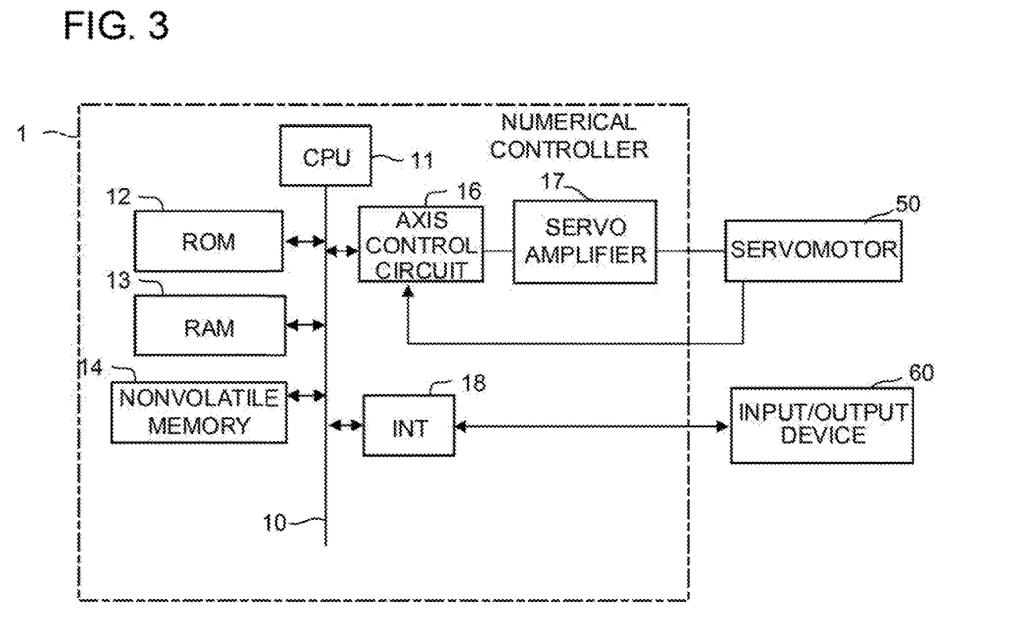
FIG. 3 is a diagram illustrating a hardware configuration example of a numerical controller.

FIG. 3 is a schematic hardware configuration diagram illustrating a numerical controller 1 according to an embodiment. The numerical controller 1 is a device that controls, for example, an industrial machine that performs drilling. The numerical controller 1 includes a central processing unit (CPU) 11, a read only memory (ROM) 12, a random access memory (RAM) 13, a nonvolatile memory 14, a bus 10, an axis control circuit 16, a servo amplifier 17, and an interface 18. A servomotor 50 and an input/output device 60 are connected to the numerical controller 1.

The CPU 11 is a processor that controls the numerical controller 1 as a whole. The CPU 11 reads a system program stored in the ROM 12 via the bus 10. The CPU 11 controls the entire numerical controller 1 according to the system program.

For example, the ROM 12 stores in advance a system program for executing various controls of a machine.

The RAM 13 temporarily stores calculation data or display data, and data, a program, or the like input by an operator via the input/output device 60.

For example, the nonvolatile memory 14 is backed up by a battery (not illustrated). The nonvolatile memory 14 maintains a storage state even when a power source of the numerical controller 1 is turned off. The nonvolatile memory 14 stores data, a program, etc. input from the input/output device 60. The program and data stored in the nonvolatile memory 14 may be loaded in the RAM 13 during execution and use.

The axis control circuit 16 controls an operating axis of the machine. The axis control circuit 16 receives a movement command amount of the axis output by the CPU 11 and outputs a movement command of the operating axis to the servo amplifier 17.

The servo amplifier 17 receives the axis movement command output by the axis control circuit 16 and drives the servomotor 50.

The servomotor 50 is driven by the servo amplifier 17 to move the operating axis of the machine. In the present embodiment, a spindle is moved by the servomotor 50. For example, the servomotor 50 has a position/speed detector. The position/speed detector outputs a position/speed feedback signal. This position/speed feedback signal is fed back to the axis control circuit 16 so that position/speed feedback control is performed.

Incidentally, in FIG. 3, only one set of an axis control circuit 16, a servo amplifier 17, and a servomotor 50 is illustrated. However, in practice, the set is prepared for each axis provided in the machine to be controlled.

The input/output device 60 is a data input/output device including a display, a hardware key, etc. For example, the input/output device 60 is an MDI unit or an operation panel. The input/output device 60 displays information received from the CPU 11 via the interface 18 on a display. The input/output device 60 passes a command, data, etc. input from a hardware key, etc. to the CPU 11 via the interface 18.

Figure 15:
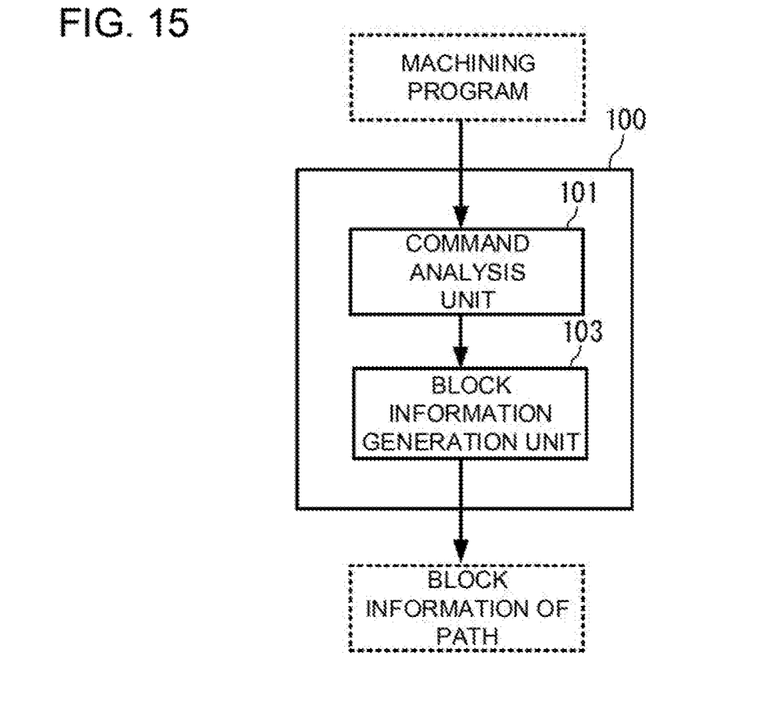
FIG. 15 is a diagram illustrating an example of a functional configuration of the numerical controller.

FIG. 15 is a block diagram illustrating an outline of a functional configuration of the numerical controller 1. The numerical controller 1 includes a command analysis unit 101 and a block information generation unit 103.

The command analysis unit 101 reads and analyzes a machining program including an axis movement command that can define line segments of a plurality of sections using one block command. The command analysis unit 101 specifies all coordinate points as movement destinations based on an analysis result of the machining program. The block information generation unit 103 generates block information of the line segments of the plurality of sections based on the coordinate points specified by the command analysis unit 101.

Figure 4:
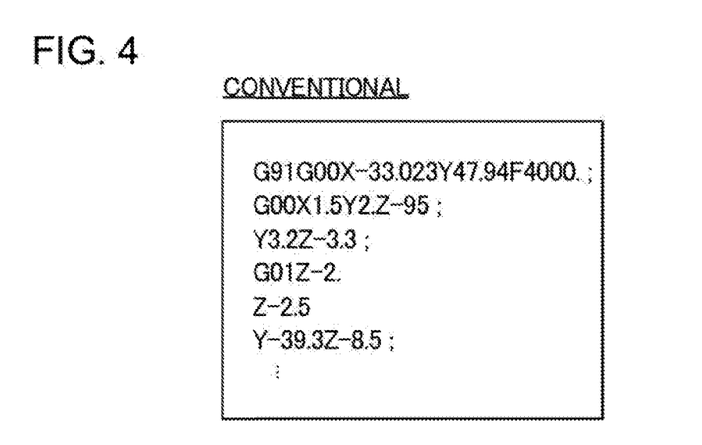
FIG. 4 is a diagram illustrating an example of a conventional axis movement command.

A specification of the axis movement command of the present embodiment that can be analyzed by the command analysis unit 101 will be described with reference to FIG. 4 to FIG. 6. FIG. 4 is a diagram illustrating an example of a conventional axis movement command. The axis movement command includes a combination of an address indicated by alphabets (G, X, Y, Z, etc.) and a command value indicated by numbers. Commands such as G91 and G00 are referred to as G codes. G code causes the numerical controller 1 to execute a preparation function for performing machining. A command such as F4000. is a movement command. A numerical value of the movement command indicates a feed speed. Each command such as X1.5, Y2., and Z-95 designates a coordinate value or a movement amount of an X-axis, a Y-axis, and a Z-axis. According to a conventional description method for the axis movement command, in principle, only one line segment can be expressed by one block (one line of the machining program).

On the other hand, in the axis movement command of the present embodiment, content corresponding to a command for a plurality of conventional blocks can be described using a command of one block. This axis movement command has the following features.

(1) Within a command of one block, it is possible to designate a plurality of command values (coordinate values, movement amounts, etc.) corresponding to each address.

(2) A correlation between an address and a command value is described according to a predetermined rule. The rule is not particularly limited. For example, the following rules are present.

(a) A correlation between an address and a plurality of command values is defined by a plurality of types of predetermined delimiters. For example, in an example of FIG. 5, a set of command values for each section is defined by "[" and "]" (square brackets). In addition, "," (comma) indicates a delimiter between command values of each address. That is, [x1, y1, z1] is a command value group that defines a line segment in a first section, x1 is an X-axis command value, y1 is a Y-axis command value, and z1 is a Z-axis command value. Similarly, [x2, y2, z2] is a command value group that defines a line segment in a second section, and [x3, y3, z3] is a command value group that defines a line segment in a third section.

Figure 5:
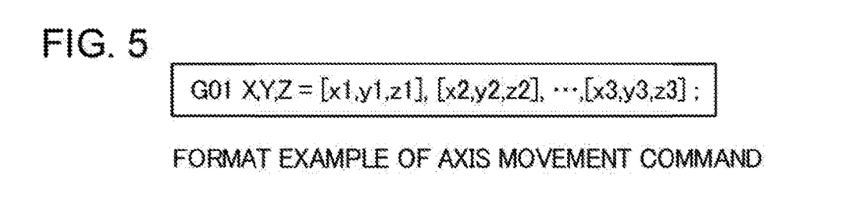
FIG. 5 is a diagram illustrating an example of an axis movement command in the present embodiment.
Figure 6:
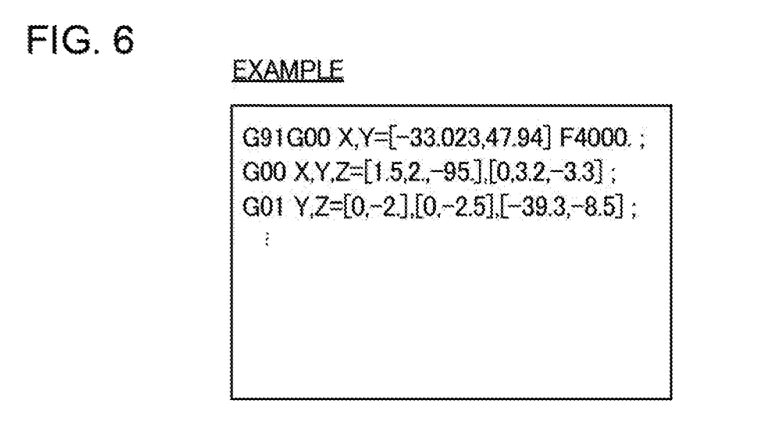
FIG. 6 is a diagram illustrating an example of an axis movement command in the present embodiment.

FIG. 6 is an axis movement command described according to a format illustrated in FIG. 5. Content described in FIG. 6 is equivalent to the axis movement command according to a conventional description method illustrated in FIG. 4. Axis movement commands described from a second line to a third line in FIG. 4 are integrated in a second line in FIG. 6. Similarly, axis movement commands described from a fourth line to a sixth line in FIG. 4 are integrated in a third line in FIG. 6. In the present embodiment, it is possible to integrate conventional commands for a plurality of blocks into a command for one block.

(b) Correlations between addresses and a plurality of command values are defined by predetermined delimiters and numerical order. For example, a command value group x1, y1, and z1 defining line segments in a first section (x1 is a command value on the X-axis, y1 is a command value on the Y-axis, and z1 is a command value on the Z-axis), a command value group x2, y2, and z2 defining line segments in a second section (x2 is a command value on the X-axis, y2 is a command value on the Y-axis, and z2 is a command value on the Z-axis), . . . , a command value group xn, yn, and zn defining line segments in an n-th section (xn is a command value on the X-axis, yn is a command value on the Y-axis, and zn is a command value on the Z-axis) can also be collectively described for each section as follows.

X, Y, Z=x1, y1, z1, x2, y2, z2, . . . , xn, yn, zn

Alternatively, the command value groups can also be collectively described for each address as follows.

Figure 8:
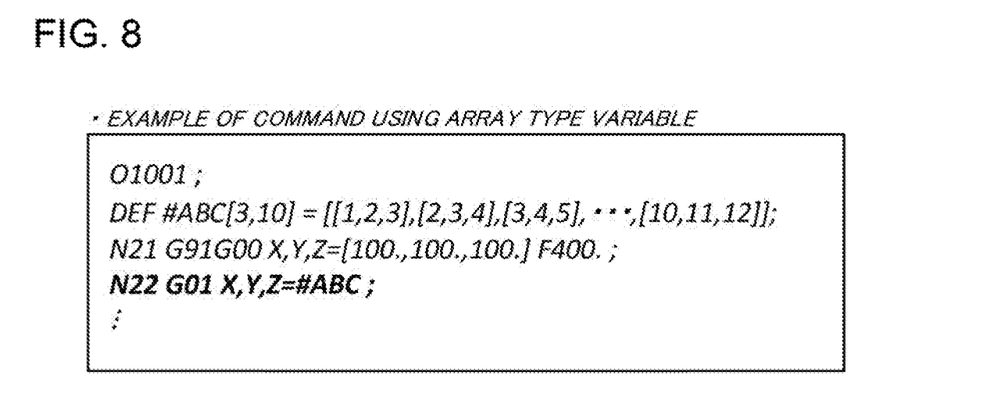
FIG. 8 is a diagram illustrating an example of an axis movement command in the present embodiment.

X, Y, Z=x1, x2, . . . , xn, y1, y2, . . . , yn, z1, z2, . . . , zn (c) The command shown in the above item (a) or (b) can also be described using an array type variable. FIG. 8 (second line and fourth line) is an example in which the following axis movement command A is rewritten using an array type variable. The axis movement command A is described according to a format shown in FIG. 5. In FIG. 8, a right side of the axis movement command A is stored in advance in an array type variable (second line), and the command is described in a form referring to the variable (fourth line).

Axis movement command A:
N22 G01 X, Y, Z=[1, 2, 3], [2, 3, 4], [3, 4, 5], . . . , [10, 11, 12];

(d) A command shown in the above item (a) or (b) can also be described using an external file reference.

Figure 9:
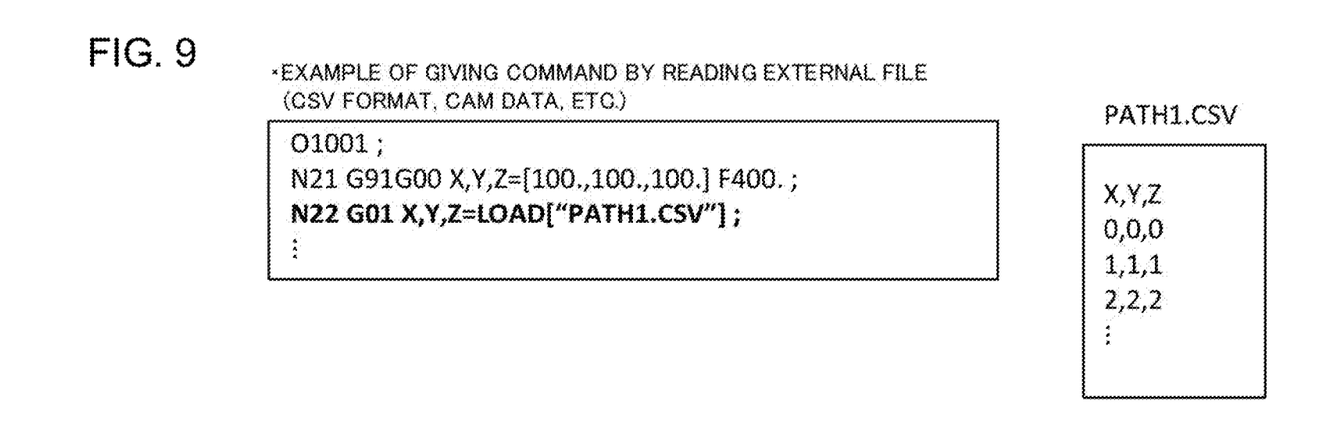
FIG. 9 is a diagram illustrating an example of an axis movement command in the present embodiment.

FIG. 9 (third line) is an example in which the following axis movement command B is rewritten using an external file reference. The axis movement command B is described according to a format shown in FIG. 5. In FIG. 9, content corresponding to a right side of the axis movement command B is described in advance in an external file (PATH1.csv), and the command is described in a form referring to content of the file (third line).

Figure 10:
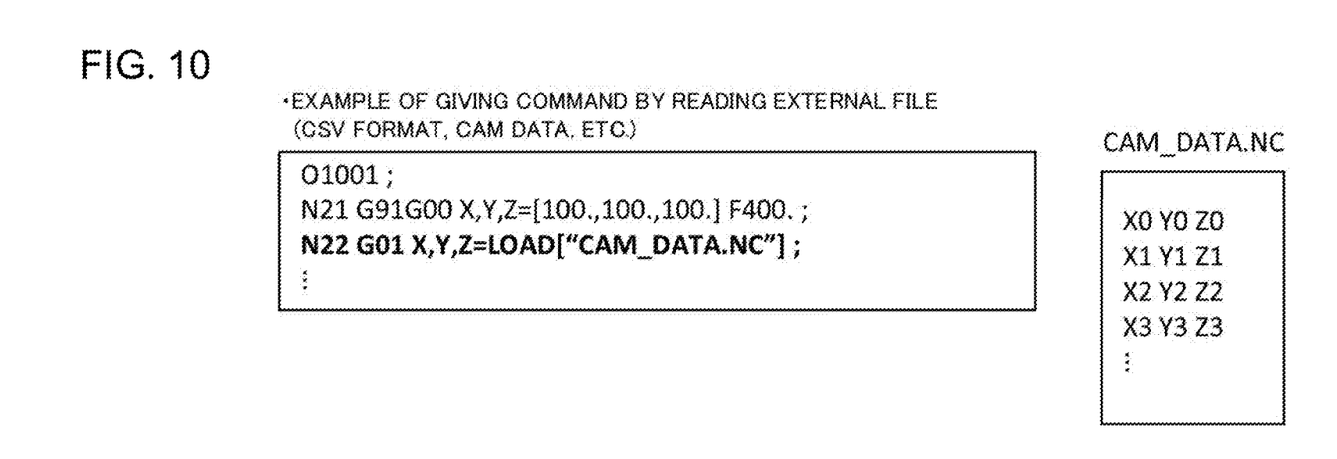
FIG. 10 is a diagram illustrating an example of an axis movement command in the present embodiment.

Axis movement command B:
N22 G01 X, Y, Z=[0, 0, 0], [1, 1, 1], [2, 2, 2], . . . ;

Similarly, FIG. 10 (third line) is an example in which the following axis movement command C is rewritten using an external file reference. The axis movement command C is described according to a format shown in FIG. 5. In FIG. 10, content corresponding to a right side of the axis movement command C is described in advance in an external file (CAM_DATA.NC), and the command is described in a form referring to content of the file (third line).

Axis movement command C:
N22 G01 X, Y, Z=[X0, Y0, Z0], [X1, Y1, Z1], [X2, Y2, Z2], [X3, Y3, Z3], . . . ;

A file format of the external file or a format of the axis movement command may be any file format or format as long as a correlation with the command content before rewriting is maintained. However, it is necessary that the command analysis unit 101 can recognize the correlation and restore the command content before rewriting.

Figure 11:
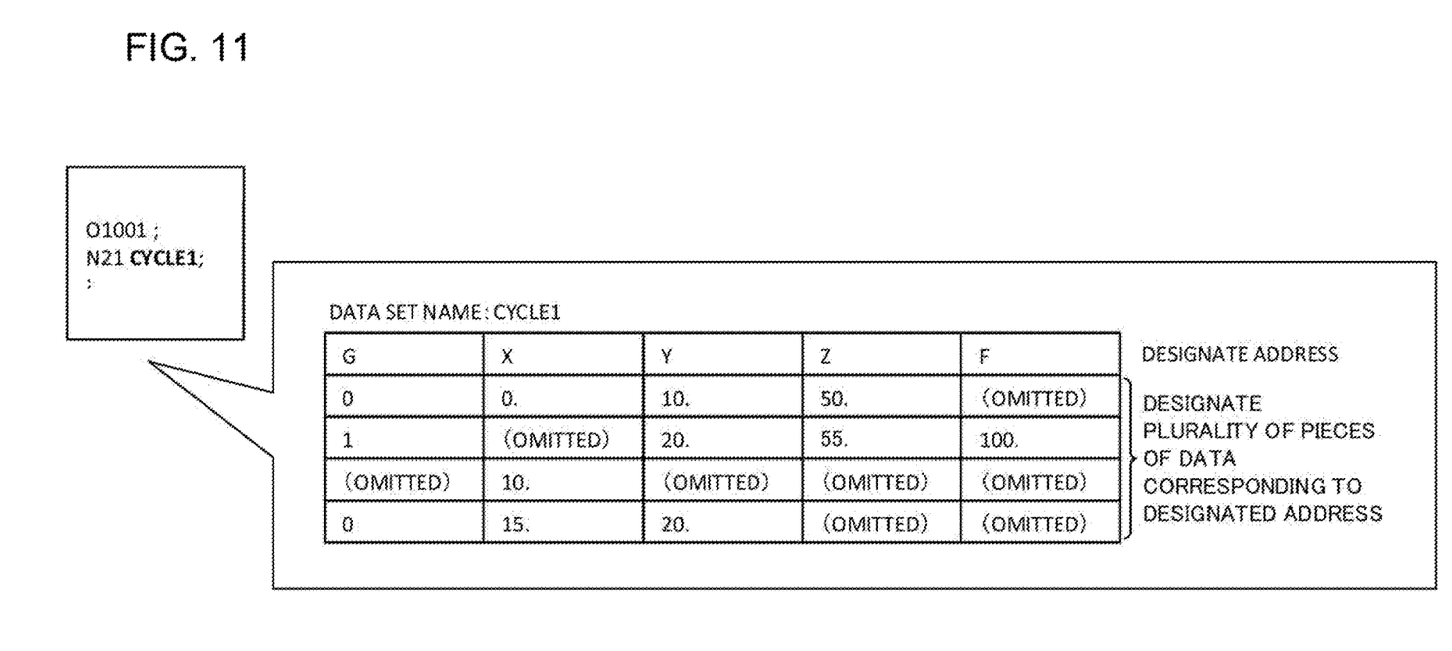
FIG. 11 is a diagram illustrating an example of an axis movement command in the present embodiment.

(e) A command can also be described in a form referring to data set. FIG. 11 (second line) is an example in which the following axis movement command D is rewritten into a format referring to a data set. In FIG. 11, content of a part following N21 of the axis movement command D is stored in advance in a data set (for example, a structure) (CYCLE1), and the command is described in a form referring to content of the data set (second line).

Axis movement command D:
N21 G00 X0. Y10. Z50.;
G01 Y20. Z55. F100.;
X10.;
G00 X15. Y20.;

The format of the data set may be any format as long as a correlation with the command content before rewriting is maintained. However, it is necessary that the command analysis unit 101 can recognize the correlation and restore the command content before rewriting. Even when a data set is used, an address is described only once in the data set.

Figure 7:
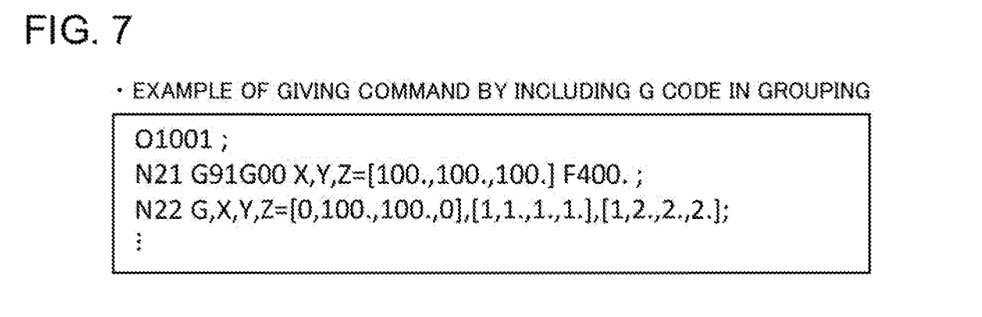
FIG. 7 is a diagram illustrating an example of an axis movement command in the present embodiment.

(3) Commands such as G codes can also be integrated and described as shown in item (2). For example, FIG. 7 shows an example in which a command described as the following axis movement command E in a conventional description method is integrated into one line according to the format of FIG. 5 and described.

Axis movement command E:
G00 X100, Y100, Z0
G01 X1, Y1, Z1
G01 X2, Y2, Z2

(4) For an address having no change in a command value, command description may be omitted. For example, in an example of FIG. 6, when the Z-axis does not move (first line), only the commands related to the X-axis and the Y-axis are described, and no command is described for the Z-axis. Similarly, when the X-axis does not move (third line), only commands related to the Y-axis and the Z-axis are described in this block, and no command is described for the X-axis.

(5) A command value (numerical value) may be omitted while defining an axis address. For example, the axis movement command F can be described as follows.

Axis movement command F:
G01 X, Y=[0, 0], [1,], [, 2], . . .

This command is obtained by integrating and describing an axis movement command G, which has been described as follows in a conventional description method, into one line.

Figure 12:
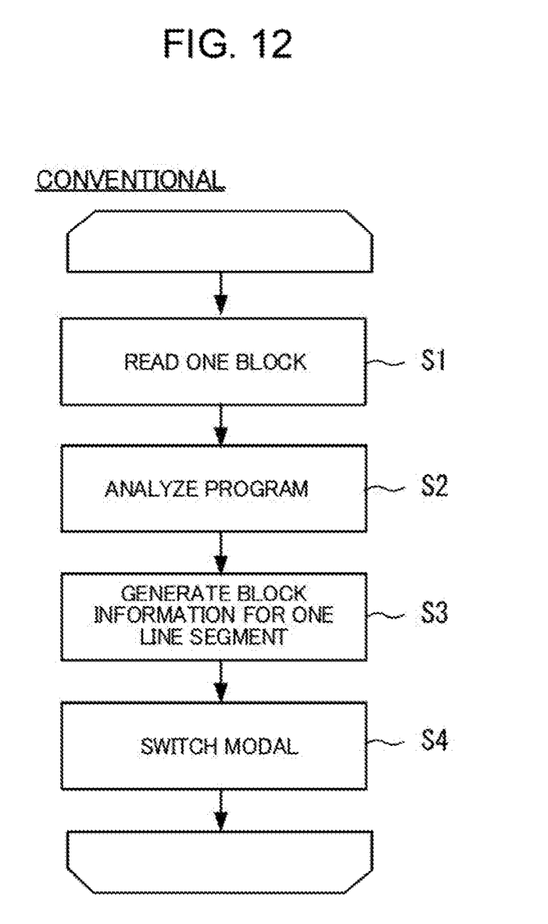
FIG. 12 is a diagram illustrating an operation example of a conventional numerical controller.

Axis movement command G:
G01 X0 Y0;
G01 X1;
G01 Y2;

A characteristic operation of the numerical controller 1 will be described with reference to flowcharts of FIG. 12 and FIG. 13. FIG. 12 is a diagram illustrating an operation of a conventional numerical controller. The conventional numerical controller reads one block of a machining program (S1) and analyzes the block (S2). Then, block information of one line segment described in the block is generated (S3). In addition to processing of S1 to S3, the numerical controller performs an ancillary processing such as modal switching or determination of various signals for each block (S4). The numerical controller repeats processing of S1 to S4 for all blocks of the machining program.

Figure 13:
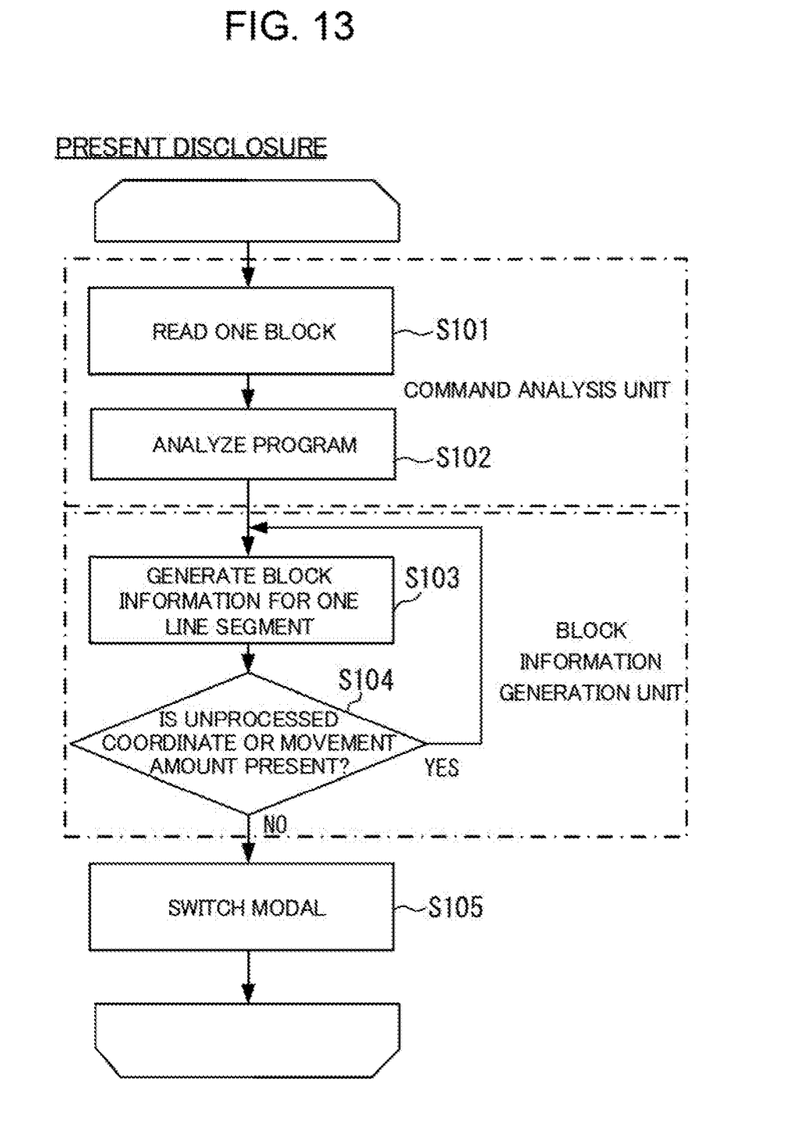
FIG. 13 is a diagram illustrating an operation example of the numerical controller.
Figure 14:
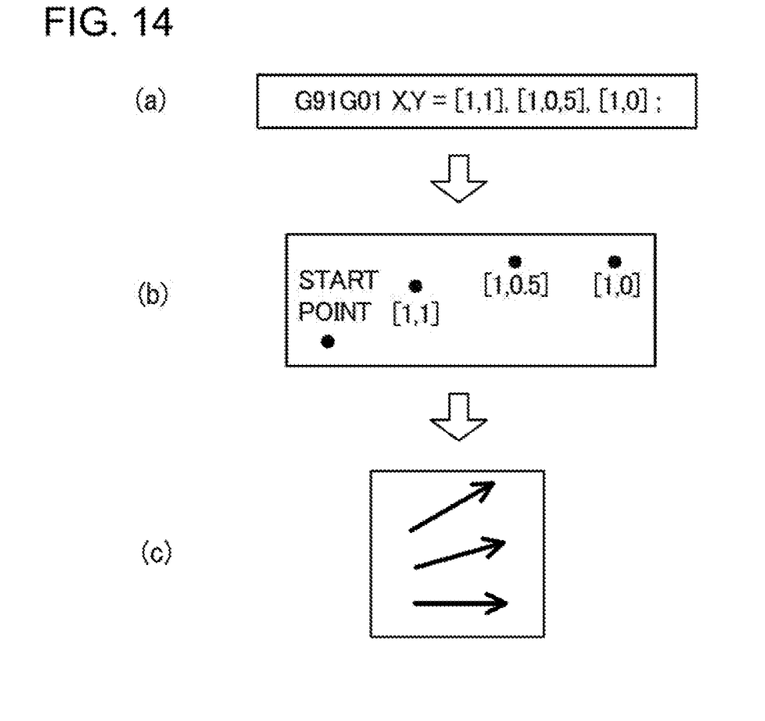
FIG. 14 is a diagram illustrating an operation example of the numerical controller.

FIG. 13 is a diagram illustrating an operation of the numerical controller 1 according to the present embodiment. The command analysis unit 101 of the numerical controller 1 reads one block of the machining program (S101) and analyzes a program of the read one block (S102). Here, when the machining program successively defines line segments of a plurality of sections with a command of one block described according to the above-described format (see (a) of FIG. 14), the command analysis unit 101 analyzes the block and extracts a plurality of coordinate values or movement amounts described therein (see (b) of FIG. 14).

The block information generation unit 103 generates block information of one line segment using the coordinate point or the movement amount extracted by the command analysis unit 101 (S103). Here, block information of one line segment is generated using an unprocessed coordinate point or movement amount having an earliest command order (S103). Thereafter, it is determined whether an unprocessed coordinate point or movement amount is left (S104). When the unprocessed coordinate point or movement amount is left, the processing returns to S103, and block information of one line segment is generated. When no unprocessed coordinate point or movement amount is left, ancillary processing such as modal switching or determination of various signals is executed (S105), and processing of this block is terminated. The numerical controller 1 repeats processing of S101 to S105 for all blocks of the machining program.

According to the present embodiment, the command analysis unit 101 reads and analyzes a machining program including an axis movement command that can define line segments of a plurality of sections with a command of one block, and specifies all coordinate points as a movement destination. The block information generation unit 103 generates block information of line segments of a plurality of sections based on the coordinate points specified by the command analysis unit 101. In this way, it is possible to command a machining path including a plurality of line segments using a small number of blocks.

In addition, according to the present embodiment, it is possible to prefetch one block of the machining program to generate a plurality of pieces of block information. For this reason, it is possible to suppress overhead associated with ancillary processing such as modal switching and determination of various signals. As a result, efficiency is improved compared with conventional prefetch processing.

In addition, conventionally, only a canned operation can be performed in a canned cycle. However, in the present embodiment, a path can be freely set in the form of a matrix shown in FIG. 11 using a data set. In this way, it is easy for an operator to understand a command point.

In addition, in the present embodiment, by performing an axis movement command in a format referring to an array type variable or an external file, it is possible to command axis movement without specifying a coordinate value directly on the program. In this way, versatility increases because the coordinate values can be reused.

In addition, in the present embodiment, block information of line segments of a plurality of sections is created using a command of one block. For this reason, it is unnecessary to use a specific subprogram function or a specific character. As a result, it is possible to introduce a technology according to the present disclosure at a low cost.

Incidentally, the present disclosure is not limited to the above-described embodiment, and can be appropriately changed without departing from the spirit of the present disclosure. For example, in the above-described embodiment, an example in which the block information generation unit 103 generates the block information of the line segments has been mainly described. However, the present disclosure is not limited thereto. For example, block information of any path such as an arc can be generated by a similar scheme.

In addition, the above-described embodiment shows an example in which G codes related to commands in a plurality of sections are integrated into one line. However, the present disclosure is not limited thereto. For example, it is also possible to similarly integrate any commands of a machining command such as F code, an auxiliary function such as M code, etc.

A description method of a correlation between an address and a plurality of command values shown in the above embodiment is merely an example. When a command related to a path of a plurality of sections is described in one block, an address is described only once, and at least one command value corresponding to each address is defined, description in any format is allowed.

The invention claimed is:

1. A numerical controller for analyzing an axis movement command described in a machining program to generate block information of a path, the numerical controller comprising:
    a command analysis unit for analyzing the machining program in which the axis movement command for a plurality of successive line segment movements along a same axis is described in one block of the machining program in a reading processing for the one block to specify a plurality of coordinate values or a plurality of movement amounts corresponding to the plurality of the successive line segment movements along the same axis; and
    a block information generation unit for generating the block information for the plurality of the successive line segment movements along the same axis based on the plurality of coordinate values or the plurality of movement amounts of the successive line segment movements along the same axis,
    wherein an address to the same axis is described only once and a plurality of command values corresponding to the address to the same axis are described according to a predetermined order of the successive line segment movements along the same axis in the axis movement command, and the command analysis unit specifies a correlation between the address to the same axis and the plurality of command values according to the order.

2. The numerical controller according to claim 1, wherein a modal switching processing is performed after the block information for the plurality of the successive line segment movements described in the one block is generated.

3. The numerical controller according to claim 1, wherein the plurality of command values are given as array type variables.

4. The numerical controller according to claim 1, wherein the plurality of command values are given by an external file.

5. The numerical controller according to claim 1, wherein the address and the plurality of command values are given as a data set.

6. The numerical controller according to claim 1, wherein the address is related to various commands other than a command of a coordinate value of the plurality of coordinate values or a movement amount of the plurality of movement amounts.

7. The numerical controller according to claim 1, wherein the address is allowed to be omitted when there is no change in the plurality of command values corresponding to the address.

8. The numerical controller according to claim 1, wherein the plurality of command values corresponding to the address is allowed to be omitted when there is no change in the plurality of command values.

\* \* \* \* \*